M. M. STAPLES.
WATER-WHEEL.
No. 176,087. Patented April 11, 1876.
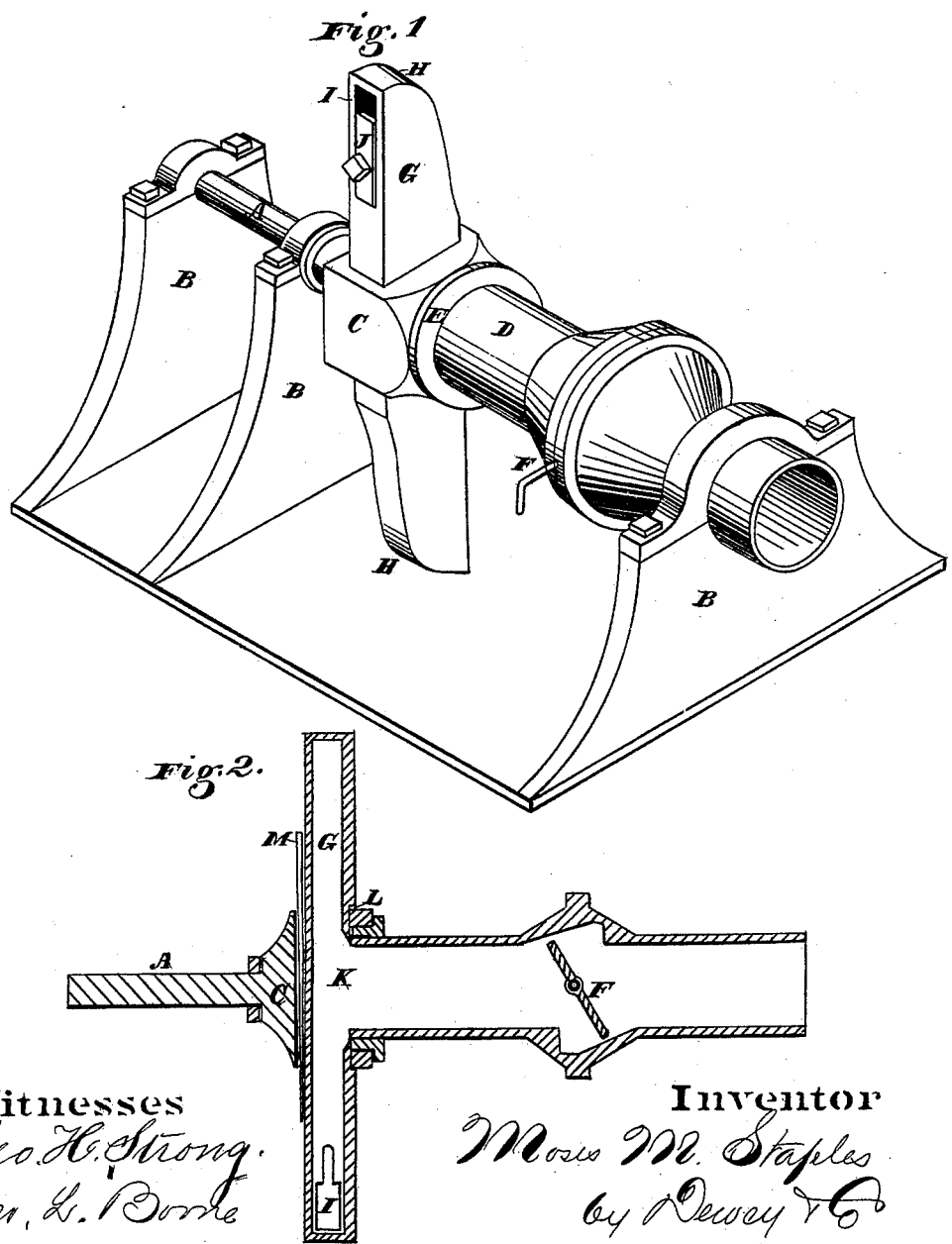

UNITED STATES PATENT OFFICE

MOSES M. STAPLES, OF SAN FRANCISCO, CALIFORNIA.

IMPROVEMENT IN WATER-WHEELS.

Specification forming part of Letters Patent No. 176,087, dated April 11, 1876; application filed January 8, 1876.

*To all whom it may concern:*

Be it known that I, MOSES M. STAPLES, of San Francisco city and county, State of California, have invented an Improved Water-Wheel; and I do hereby declare the following description and accompanying drawings are sufficient to enable any person skilled in the art or science to which it most nearly appertains to make and use my said invention or improvement without further invention or experiment.

My invention relates to certain improvements in that class of water-wheels which are intended to rotate by the centrifugal force of a stream, under a considerable head, escaping from the periphery of the wheel; and it consists in a novel method of constructing the wheel, so that I am enabled to set it up at places where it would be difficult to transport a complete wheel; and I can also repair or replace the wheel at any time at small expense. It also consists in a means for regulating the size of the discharge-opening, so as to proportion it to the amount of water supplied and keep the wheel full.

Referring to the accompanying drawings for a more complete explanation of my invention, Figure 1 is a perspective view of my wheel. Fig. 2 is a longitudinal section of shaft cutting the wheel.

A is a shaft, which I have shown, in the present case, mounted upon bearings B in a horizontal position. At the end of this shaft is formed a square, round, or other suitable-shaped hub, C, which has its opposite end fitted to receive the end of a supply-pipe, D. This supply-pipe enters the hub, as shown, and has a stuffing-box with a collar or gland, E, to make it water-tight. A valve, F, within this pipe regulates or cuts off the supply of water at will. The shaft, hub, and the terminal section of pipe may be finished up and transported to the point where the wheel is needed for use. In order to form the wheel I take such lumber as can be obtained and form a box, G, of any suitable length, twice the desired radius of the wheel, and of a size to suit the body of water to be employed or the power needed. The corners of the ends diagonally opposite to each other are rounded or curved, as shown at H, so as to form a directing-pipe for the water. The front opposite this curved back at each end is perforated by an opening, I, for the escape of the water. This opening has a slide, J, which may be adjusted and held by a screw, so as to give an opening of any desired size. This box, when completed, is made so as to fit an opening made directly through the hub on right angles with the shaft, and this opening (and a transverse section of the box) should be preferably of the shape of a parallelogram. One side of the box, at the center, is perforated by an opening, K, which stands opposite to the end of the supply-pipe D, so as to receive water. A notch or shallow cut, L, is made upon this side of the box, to fit the edge of the opening in the hub and prevent the box from shifting its position, and a slightly wedge-shaped piece, M, is driven into the space between the box and the other side of the opening in the hub, thus holding the box firmly in place and making the wheel complete. The arms of the wheel may be made of any length desired, and different sizes may be fitted to same hub, and new ones easily made to replace those which are worn out. This wheel may be used with good effect, also, in driving small mechanism, as lathes, sewing-machines, &c., by the use of a small stream of water having a considerable head.

Having thus described my invention, what I claim, and desire to secure by Letters Patent, is—

1. The hub C and shaft A, in combination with the independent removable arms formed of the box G, constructed as shown, and fixed within the hub, substantially as herein described.

2. The elongated box G, forming the arms of a wheel, perforated in the center of one side, and secured within the hubs C by the notch L and the wedge M, said box being perforated at opposite corners, and having the adjustable gates J to regulate the flow of water, substantially as described.

In witness whereof I hereunto set my hand hand and seal.

MOSES M. STAPLES. [L. S.]

Witnesses:
GEO. H. STRONG,
JNO. L. BOONE.